(12) United States Patent
Fiedlschuster et al.

(10) Patent No.: US 6,213,306 B1
(45) Date of Patent: Apr. 10, 2001

(54) PROCESS AND FACILITY FOR TREATING AND SORTING RECYCLABLE WASTE MATERIALS

(75) Inventors: Thomas Fiedlschuster, Hof; Harald Pilz, Chemnitz, both of (DE)

(73) Assignee: F & P Sortiertechnik GmbH, Hof (DE)

(*) Notice: Subject to any disclaimer, the term of this patent is extended or adjusted under 35 U.S.C. 154(b) by 0 days.

(21) Appl. No.: 09/125,477

(22) PCT Filed: Feb. 26, 1997

(86) PCT No.: PCT/DE97/00376

§ 371 Date: Aug. 19, 1998

§ 102(e) Date: Aug. 19, 1998

(87) PCT Pub. No.: WO97/31716

PCT Pub. Date: Sep. 4, 1997

(30) Foreign Application Priority Data

Feb. 28, 1996 (DE) .............................. 196 07 386

(51) Int. Cl.[7] .............................. B03B 1/00; B03C 7/00; B02C 1/30; B02C 5/28; B02C 17/02

(52) U.S. Cl. .............................. 209/3; 209/12.1; 209/38; 209/172; 209/173; 209/930; 241/20; 241/24.12; 241/24.15

(58) Field of Search .............................. 209/3, 12.1, 172, 209/172.5, 173; 241/20, 24.12, 24.15, 29, 152.1, 152.2, 146, 147, 155, 156, 162

(56) References Cited

U.S. PATENT DOCUMENTS

| | | | |
|---|---|---|---|
| 4,610,396 | * | 9/1986 | Carbonell Serra et al. ............ 241/24 |
| 4,809,854 | * | 3/1989 | Tomaszek ............................. 209/3 |
| 5,255,859 | * | 10/1993 | Peacock et al. ..................... 241/24 |
| 5,277,758 | * | 1/1994 | Brooks et al. ...................... 241/24 |

(List continued on next page.)

FOREIGN PATENT DOCUMENTS

| | | |
|---|---|---|
| 811821 | 8/1951 | (AT) . |
| 363051 | 7/1981 | (DE) . |

(List continued on next page.)

Primary Examiner—Donald P. Walsh
Assistant Examiner—Brett A Martin
(74) Attorney, Agent, or Firm—Jordan and Hamburg LLP

(57) ABSTRACT

The invention refers to a procedure and an installation for the pure, according to sort, processing of recoverable material refuse, with a selection of heavy disruptive materials, with a crushing process for the remaining raw refuse, with segregating processes for recoverable materials from the crushed raw refuse up to a mixture of plastic chips and with separating processes for the extraction of pure, according to sort, plastics.

The following procedural steps are proposed with the object of reducing the procedural steps, the reduction of the expenditure of energy with simultaneous enhancement of the sorting quality:

a) soaking of the singled raw refuse in a fluid with the object of dissolving, parting and peeling of soluble components, b) selecting of heavy disruptive materials in a horizontal fluid flow dependent upon the sinking speed, c) conveying of the moist raw refuse liberated from hearty disruptive materials to the crushing installation, d) crushing of the moist raw refuse to a chip size of less than 55 mm with simultaneous drying by the crushing heat, e) separation of recoverable materials up to the mixture of different types of plastic,
in at least one process step for the separation of minimum-size and light substances, especially fibre substances, silicon compounds and organic contaminations, and/or
in at least one procedural step for the segregation of metals, and f) separation of the mixture of different types of plastic according to the float-and-sink method dependent upon the density.

10 Claims, 1 Drawing Sheet

U.S. PATENT DOCUMENTS 4,849,116 * 7/1989 Weinmann .
5,104,047 * 4/1992 Simmons ............................. 241/24

FOREIGN PATENT DOCUMENTS

| | | |
|---|---|---|
| 4125164 | 2/1992 | (DE) . |
| 4222379 | 1/1994 | (DE) . |
| 4300870 | 7/1994 | (DE) . |
| 4306781 | 9/1994 | (DE) . |
| 0074346 | 3/1983 | (EP) . |

\* cited by examiner

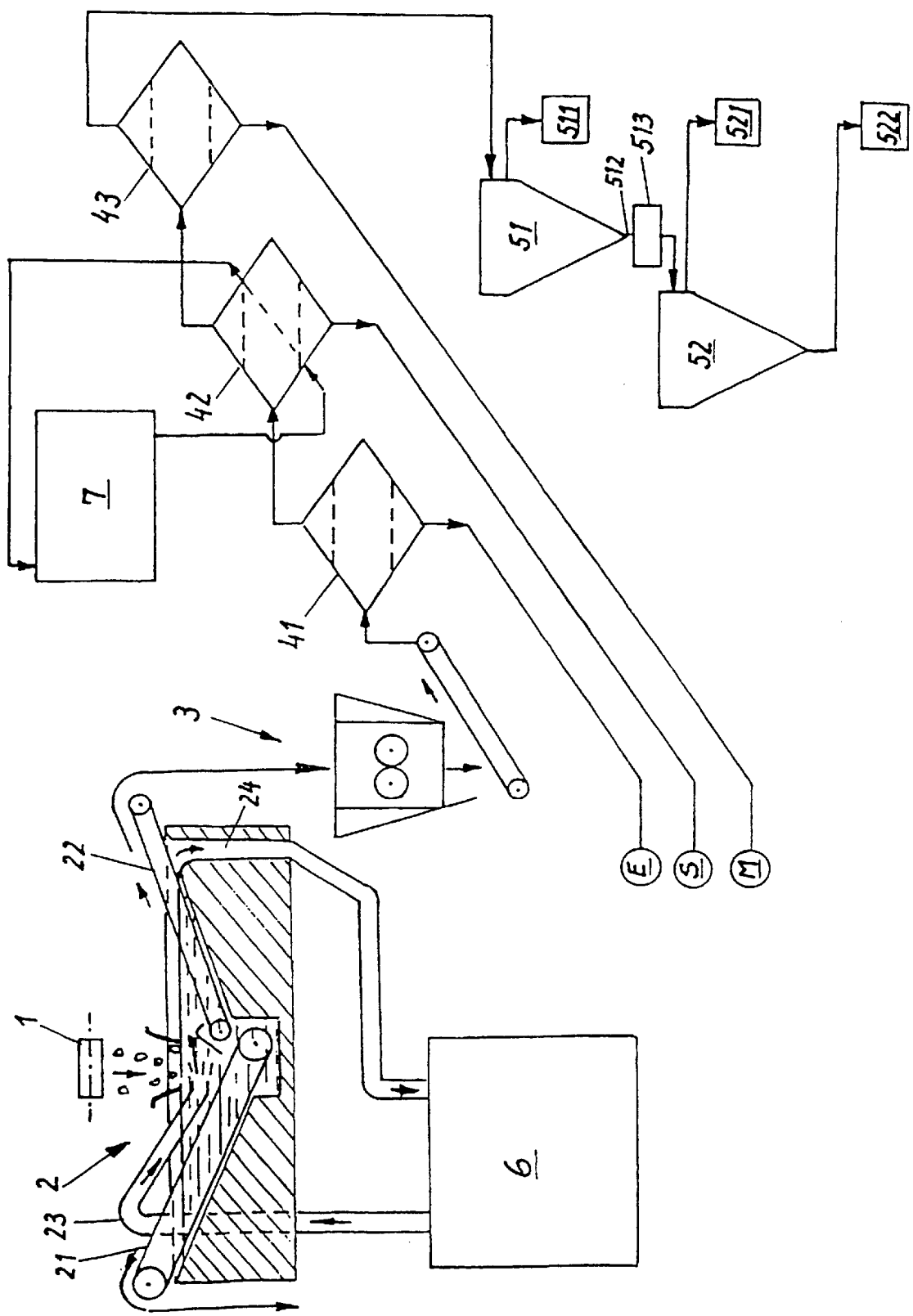

PROCESS AND FACILITY FOR TREATING AND SORTING RECYCLABLE WASTE MATERIALS

BACKGROUND OF THE INVENTION

The invention relates to a procedure and an installation for the pure processing, according to general type, of recoverable material refuse with an initial selection of heavy disruptive materials, with a crushing procedure for the remaining raw refuse, with separating procedures for different recoverable materials from the crushed raw refuse up to a mixture of plastic chips and with separating procedures for the recovery of plastics as pure as possible according to type.

Various procedures for the processing of industrial, commercial and/or household refuse, especially of recoverable material refuse, of the aforementioned type described are known.

For example, DE 43 00 870 describes one such procedure for the sorting of recoverable material waste.

In this case, recoverable material waste means waste iron, glass, non-ferrous metals, paper, plastic etc. The sorting procedure begins with the separating of iron by a magnetic separator.

All remaining materials are subsequently crushed with a shredder.

This procedure is followed by the soaking of the shredded refuse with water.

Glass and components heavier than water are separated by means of a float-and-sink separation. A distinction is made between plastics and other recoverable materials on a subsequently following vibrating conveyor on the basis of the differentiated specific density.

Such a procedure is not entirely effective. The magnetic separator does not make it possible to completely separate stones and similar hard materials. The stones or non-ferrous metals are not separated by a magnetic separator.

The hard objects remaining in the refuse, i.e., the heavy disruptive materials, are thus also conveyed into the shredder in the course of the crushing procedure. The tools for the crushing very quickly become blunt or even break. Frequent downtimes combined with long searches for these objects prevent a continuous processing sequence.

The degree of crushing is objectively limited under these circumstances. In many cases, an additional crushing procedure has to be inserted at a later date.

Further deficiencies are also caused by the sequence of the following separating procedures. With the soaking of crushed refuse in water, the approximately palm-sized refuse chips are separated dependent upon the density of the water.

Repeated separating procedures which can possibly be very expensive must subsequently be performed for the separation of different chips consisting of iron, non-ferrous metals, stores and glass.

It is usually unavoidable to remove as much of the water as possible from the refuse chips prior to the majority of these separating procedures. Drying procedures necessitate additional installations and the supply of a great quantity of energy.

The further processing of the light materials in this procedure is accomplished by a vibrating conveyor. The separation, for example between plastic and paper, is unsatisfactory with regard to the purity.

A repeated crushing of the plastic chips and a washing procedure, if necessary, cannot be ruled out prior to the further processing of the plastic parts in the sense of separating them into different types of plastic.

The expenditure for such a procedure is high. The result remains altogether unsatisfactory.

Another procedure for the treatment of refuse is offered by DE 42 22 379 A1. The procedure begins with the screening of the raw refuse in different fractions on the basis of the grain size.

The oversize parts of the raw refuse disturbing the treatment process are detected by manual classification and removed.

The medium and classified and oversize grain fractions liberated from disruptive parts are brought together. This is followed by the crushing, the separation of iron, the screening into several size fractions, the air classification, the repeated mixing of different fractions, a repeated crushing of fractions and other mechanical selective procedures. There is still no separation of the fractions into specified recoverable raw materials at the end of this very expensive treatment process.

Separating procedures of such types have to be performed additionally after such a treatment.

This procedure requires several screening operations. All of these screening operations must be preceded by energy-consuming drying procedures in order to ensure a continuous operation.

The above described procedure for the processing of refuse is extremely expensive.

Furthermore, the number of procedures in which mechanical crushing and selection operations are performed has a considerable impact on the environment.

The necessary efficient air cleaning installations additionally increase the costs for the procedure.

A further procedure for the processing of mixtures of refuse abounding in plastic is known from DE 43 06 781 A1.

In this procedure, the separated refuse is screened—as already described above—and manually liberated from disruptive materials.

This mixture of refuse is subsequently fed to a set of rotating shears and is crushed. This procedure is followed by an airstream sorting by which the mixture is separated into heavy and light material.

In the first instance, the metals are separated from the heady material in several procedural steps.

Then, the remaining heavy material and the light material are fed to a further crushing process and then to the separating operations in which the individual types of plastic are then separated.

This procedure also has decisive disadvantages.

Above all, the manual separation of disruptive parts from the raw refuse is unacceptable in the long run. The preceding screening of the raw refuse certainly simplifies the manual separating process, but there is still no certainty that disruptive parts, especially large stones, are completely removed prior to the crushing process.

The rotating shears frequently break down and often cause long downtimes during which the disruptive parts must be manually located in large refuse storage devices and then removed.

The tools of the crushing installation also wear down quickly in spite of cooling and must frequently be replaced.

This is why the degree of crushing must be low at the first level. A second crushing procedure after the separation of metals is unavoidable.

The fact that there is a considerable development of dust during the crushing process is also disadvantageous. This necessitates a large-scale covering of the installation as well as efficient air-conditioning equipment.

The connected air separation installation additionally requires a similar expenditure.

Experience has shown that in this operation, organic components of the refuse remain adhesive at least up to the first float-and-sink separating installation. The same applies to labels and other removable components of the raw refuse. The quality of the separation of the recoverable materials leaves much to be desired.

It is an object of the present invention to provide a procedure for the reprocessing of refuse materials and the separation of recoverable materials which in case of a continuous operation wish a scheduled maintenance cycle, with a minimum number of process steps, under minimum environmental impact, with a minimum of energy makes an optimal separation of recyclable raw materials possible.

SUMMARY OF THE INVENTION

By means of the soaking prior to the process and the selecting of the heavy disruptive materials according to the sinking speed in a cross-flow, in the first instance all of the solid, heavy and hard disruptive materials can be reliably removed from the raw refuse and the lighter raw refuse at a side-located place can be moved from the separating container to further processing.

Thus, the parts which could destroy or blunt the cutting edges of the crushing tools are largely separated from the process prior to the crushing process of the remaining refuse components.

It is then possible to reliably guarantee the crushing of the lighter refuse materials in one single step of the process up to a relatively small chip size suitable for separating and segregating processes.

The complete and/or at least partial removal of water-soluble substances and labels is stated as a further positive effect of the soaking. Subsequent crushing, segregating, drying and separating processes can be organized in a more efficient manner.

The feeding of the still wet material to the crushing installation has the advantage of counteracting the development of dust at this area. The development of heat originating from the crushing procedure supports the necessary drying procedure prior to the first separating process.

At the same time, the fluid in the raw refuse effectively provides cooling for the crushing tools.

The subsequent separating procedures for other components of the refuse mixture should preferably, but not imperatively, be carried out in the defined sequence.

The separation of the light substances and minimum-size parts (sand, labels etc.) removed by the soaking and the high-level crushing prior to the separation of the last metal parts has proved to be practical.

It is further advisable to perform the soaking and the separating of the heavy disruptive materials simultaneously in a cross flow in one and the same fluid. This reduces the constructive expenditure for the installation and its operation and maintenance.

Optimal separating processes are guaranteed with the designing of the crushing installation in such a manner that from the beginning on the chips are crushed to a size of approximately 10 to 15 mm, and an additional crushing of the chips prior to the separating process for the different sorts of plastic is avoided.

An especially advantageous mode of separating of recoverable materials is achieved when the separating of all ferrous components is performed immediately after the crushing process which is performed almost dust-free in a wet condition.

The chips are sufficiently dry for this procedure as a result of the heat originating in the crushing installation.

The drying process is continued during the magnetic separation so that only a small expenditure of drying is required, if at all, in a subsequent installation for the separation of the light and minimum-size materials. The next separation, preferably of the non-ferrous metals, can thus already be performed in the absence of paper, etc. which often covers the surfaces of metal parts. Even the ferrous parts hidden from the magnetic separation are also removed if an all-metal separator is employed during the final phase.

The disruptive materials, solid ferrous parts, stones or solid non-ferrous components are separated from the raw refuse at a very high degree of probability with the least expenditure and simultaneously soaked as a result of the employment of the upstream wet separator for heavy goods in sequence prior to the crushing installation. Lighter components of the raw refuse which are still heavier than water, however, remain in the raw refuse to be processed.

The shape and/or setting of the crushing installation which can thereby be employed allows an optimal execution of the subsequent separating and segregating procedures.

The combinations of installations for the separating of iron, light and minimum-size substances and non ferrous metals have stood the test in a particularly positive manner.

The completion of the procedure with the basically well-known installations for the separation of the different types of plastic, fits extremely well into the reprocessing procedure.

The invention is to be illustrated below in a more detailed manner by an example with reference to the corresponding drawing.

BRIEF DESCRIPTION OF THE DRAWINGS

FIG. 1 is a schematic overall representation of the process and installation in accordance with an embodiment of the invention.

DETAILED DESCRIPTION OF THE INVENTION

The installation to be described as an example is preferably designed for the processing of mixed plastics from hollow bodies, cups or blisters, foils or mixtures from these fractions.

This mixture of the fractions can be designated as similar to the so-called "DSD specification".

This installation is not especially designed for fractions such as paper composites, beverage composites or the like.

Installations for the disintegration of bales composed of raw refuse can be employed prior to the procedure.

The specified procedure is followed by installations for the ensilaging or redrying of the plastic components and installations for the production of granulate or agglomerate. Water treatment installations 6 for the wet separator for heavy goods 2 and necessary material collecting containers are co-ordinated with the installation.

The procedure itself runs off in the following process steps. The raw refuse is singled during the first phase. Generally used and possibly swinging grippers are employed for this purpose.

The singled raw refuse is moved by a feeding device 1 to a location as narrow as possible and deposited in the fluid of a wet separator for heavy goods 2.

The raw refuse is moved to the crushing installation 3 after the separation of the heavy goods at 2. Then the crushing of the raw refuse to the size of chips is performed during which the separation of different materials can be realized in an effective manner.

The subsequent separating procedures start with the separation of iron. Then the fractions are dried and paper, fibres, organic and sandy components are removed. The last step of the separating procedures encompasses the separation of non-ferrous metals.

The separation of the plastics according to the float-and-sink procedure follows after these procedures. The plastics separated in this procedure are stored in silos and subsequently granulated and/or agglomerated.

In the following, the individual working steps shall once again be described in detail.

First of all, the singled components of the raw refuse are moved by a feeding device 1 to a so-called wet separator for heavy goods 2.

Solid disruptive materials which are very much heavier than water and the other raw refuse substances and which usually have a very massive shape are precipitated from the mixture in this wet separator for heavy goods 2 and treated in a separate procedure which is not pursued any further.

The raw refuse liberated from heavy goods is continuously fed to a crushing installation 3.

The fluids used during the feeding operation and drained off during the crushing process are fed back into the water circulation of the wet separator for heavy goods 2.

The residual moisture in the raw refuse affects the following crushing process in a positive way.

The development of dust is evidently reduced during this process step.

A heating of the material is effectively counteracted in the crushing installation.

The crushing of the raw refuse under these conditions can be oriented to a chip size which represents an optimum for the subsequent separating processes.

The aim should be a chip size of 10–20 mm with a mean value of approximately 12 mm as an average size.

During the crushing of the refuse, an extensive drying of these crushed fractions is also achieved due to the existing heat development during the crushing process.

The fraction is fed from this crusher 3 to a calculated separation of ferrous metals.

This installation works in an actually well-known manner according to the principle of magnetic separation.

The heat from the crushing procedure stored in the mixture of chips leads to further drying during this magnetic separating process 41.

Paper and fibre material components as well as organic and inorganic residual contaminations are largely removed during the following step of separation in a horizontal basket centrifuge with automatic screen cleaning.

The disruptive materials, here present as dust, paper and fibres are continuously exhausted.

In this procedure, the paper layers separated by the fluids in the wet separator for heavy goods 2 and by the milling work during the crushing procedure are peeled from packaging and tin cans and are also removed as mainly ground light substances.

Dried dirt particles, dust, paper, fibres, grains of sand etc. are separated through the basket and exhausted. The heavily contaminated waste air is cleaned. In doing so, the high development of dust, sand and light substances is continuously filtered out and discharged at S.

Now the mixture of chips emerging from this installation 42 is dry.

This remaining mixture of chips now mainly contains chips completely liberated from iron, paper, fibres, dirt, sand and similar substances.

The dry chips can be separated in an eddy current or all-metal separator 43 in such a manner that on one hand plastics and on the other hand metals M, regardless of shape and form, are moved to further treatment. The metals M are collected in a container and thus leave the described process.

The plastic chips are mixed with fluid balanced with regard to their density during the last phase of the procedure and are separated from each other in accordance with the float-and-sink method.

Dependent on the types of plastic in hand, the separation is performed in one or in several successive steps up to the pure extraction, according to type of different kind of plastic.

Then these plastics are granulated or agglomerated in standard process steps. Thus the extracted raw materials can be conveyed in high quality to normal recycling.

The experience with this procedure has shown that a high efficiency can be guaranteed in the subsequent separating processes due to the high degree of crushing and the cleaning of the raw refuse at a very early stage.

The sequence of separating processes described here has proved to be extremely efficient. Expensive active drying processes are largely reduced. The development of heat during the crushing process is optimally used for a drying process. Moisture is present where dust is bound and cooling is necessary.

The expenditure for the processing of used carrier media, for example, the water from the wet separator for heavy goods or the air in the horizontal basket centrifuge, is limited to precisely defined processes.

The water treatment installation for the wet separator for heavy goods 2 and the air-cleaning installation 7 are respectively aligned to an optimally protectable process.

The environmental impact remains within controllable limited dimensions.

The processes running here are easy to survey and justifiable with regard to emerging fluids or dust-air mixtures.

The technical equipment employed for the execution of the described procedure shall be described below once more in detail.

The singled raw refuse is moved by the feeding device 1 within the range of a restricted area and deposited in the fluid of the wet separator for heavy goods 2.

A strong cross flow is provided in the fluid below the impact area of this raw refuse. Heavy raw refuse penetrates this strong flow without an evident change of its direction of fall. Lighter raw refuse is carried off by the fluid and deposited at a remote location at the side.

The raw refuse with different depositing rates is separately removed by conveyor belts 21, 22.

The lighter raw refuse is fed by a conveyor belt 22 to the crushing installation 3. The heavy solid parts are removed by the lower conveyor belt 21. We will not have to follow their further treatment.

The fluid in the wet separator 2 is normally water. It is fed into the container 20 by the pipeline 23 in such a manner that a strong cross flow to the conveyor belt 22 develops immediately below the feeding position of the raw waste. The fluid of the container is recirculated into a water treatment installation 6 behind the conveyor belt 22.

The lighter raw refuse is fed into the crusher 3. The chips from the raw refuse mixture with a size of approximately 12 mm are moved by a conveyor belt to the magnetic separator 41.

The ferrous chips which are separated here are collected at E.

The mixture of chips remaining in the process is moved to the separator 42 for light and/or minimum-size substances while the drying process is simultaneously continued. This installation 42 is normally designed as a well-known horizontal basket centrifuge with automatic self-purification.

The stripping of dust, dirt, fibres and paper is accomplished by the friction of the material fed into the installation at the basket walls.

The dissolved, disintegrated and flexible as well as the fine grain components, are centrifuged outwards through the basket and exhausted.

The larger and heavier plastic and metal chips are discharged from the face of the basket centrifuge 42.

The air required for the basket centrifuge 42 is cleaned in a filter of the air treatment installation 7 and fed back to the basket centrifuge 42 in a closed cycle. The substances filtered out are collected at S.

The thus processed mixture of chips which now is almost completely dry and clean is fed to an all-metal or eddy current separator 43 which works according to the well-known procedure.

Here the remaining metal parts are separated and collected at position M.

The sufficiently clean mixture of plastic chips is fed from here to the plastic sorting installation 51, 52. The plastic sorting installation consists of an initial separating device 51 which works in accordance with the float-and-sink method.

The lightest fraction 511 is separated at this point and stored for further processing.

The heavy fraction 512 separated at this point is dehydrated, largely dried at 513 and fed to the next separating device 52.

Here the separating fluid employed has a different density It separates a further sort of plastic as light fraction 521.

The separated heavy fraction 522 can either be moved directly to further processing or to another subsequent separating device.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A process for separating, according to general type, various components of collected recoverable material refuse supplied as raw material in the form of fractionated pieces, comprising:

soaking the raw material in a fluid to effect at least one of dissolving, parting and peeling of any soluble components which may be present therein from a remainder of said raw material;

introducing said raw material to a horizontal fluid flow to liberate moist raw refuse from relatively heavy component materials disruptive to carrying out subsequent steps, a composition of said moist raw refuse being dependent upon on a relative sinking speed of each of the various components of the raw material in the horizontal fluid flow, the moist raw refuse being carried in the horizontal fluid flow and collected therefrom at a position horizontally offset from a position of introduction, and the relatively heavy component materials falling downward through the horizontal fluid flow without being carried horizontally as far as the collected moist raw material;

crushing the moist raw refuse to a chip size of less than about 55 mm to form crushed raw refuse, said step of crushing resulting in generation of frictional heat contributing to simultaneous drying of the moist raw refuse;

segregating out recoverable material components from the crushed raw refuse such that a remaining mixture is substantially a mixture of different types of recyclable plastic, each of said different types having unique chemical properties including density, said step of segregating out including at least one of segregating out particulate and relatively lighter substances than a remainder of said crushed raw refuse by centrifugation and segregating out metals magnetically; and separating the mixture of different types of recyclable plastics according to a float-and-sink method in which the mixture of different types is placed in a separation fluid of suitably selected density such that at least one of said different types of plastic floats and at least another of said different types of plastic types sinks in said fluid.

2. A process according to claim 1, wherein said step of soaking the raw material and said step of introducing said raw material to a horizontal fluid flow are accomplished in a single working cycle in a same fluid.

3. A process according to claim 1 or 2, wherein the moist raw refuse is crushed into chips of a size ranging from about 10 mm to about 15 mm.

4. A process according to claim 1 or 2, wherein after said step of crushing of the moist raw refuse, said step of segregating out recoverable materials from the crushed raw refuse includes sequential steps of respectively segregating out:

ferrous metals by magnetic attraction;

said particulate and said relatively light substances by centrifugation; and residual ferrous metals and non-ferrous metals.

5. A apparatus-equipped processing line for separating, according to general type, various components of collected recoverable material refuse supplied as raw material in the form of fractionated pieces, comprising:

a wet separator for soaking the raw material in a fluid to effect at least one of dissolving, parting and peeling of any soluble components which may be present therein from a remainder of said raw material and in which said raw material is exposed to a horizontal fluid flow when introduced thereon to liberate moist raw refuse from relatively heavy component materials disruptive to continued function of at least one operational component arranged in said processing line downstream of said container, a composition of said moist raw refuse being dependent upon a relative sinking speed of the each of the various components of the raw material in the horizontal fluid flow, the moist raw refuse being carried in the horizontal fluid flow and collected therefrom at a position horizontally offset from a position of introduction, and the relatively heavy component materials falling downward through the horizontal fluid flow without being carried horizontally as far as the collected moist raw material;

at least one crushing mechanism for crushing the moist raw refuse into a chip size of less than about 55 mm to thereby form crushed raw refuse, said at least one crushing mechanism being located downstream of the device for soaking and the container;

at least one metal separator located downstream of said at least one crushing mechanism;

at least one separator downstream of said at least one crushing mechanism for segregating out particulate and relatively lighter substances than a remainder of said crushed raw refuse; and at least one device for separating a mixture of different types of recyclable plastics, each of said different types having unique chemical properties including density, according to a float-and-sink method in which the mixture of different types is placed in a separation fluid of suitably selected density received in said at least one device for separating the mixture such that at least one of said different types of plastic floats and at least another of said different types of plastic types sinks in said fluid.

6. An apparatus-equipped processing line according to claim 5, wherein said at least one metal separator and said at least one separator include:

a magnetic separator for magnetically separating ferrous metals from the crushed raw refuse;

a horizontal basket centrifuge with automatic cleaning for segregating out particulate and relatively lighter substances than a remainder of said crushed raw refuse;

an all-metal separator for segregating remaining metal chips in said crushed raw refuse; and said magnetic separator, said horizontal basket centrifuge, and said all metal separator being respectively arranged in ordered sequence downstream of said crushing mechanism.

7. An apparatus-equipped processing line according to claim 5 or 6, wherein the all-metal separator includes an eddy current separator for producing a constantly changing magnetic field resulting in repulsion effects of metallic components.

8. An apparatus-equipped processing line according to claim 5, wherein said at least one device for separating the mixture of different types of recyclable plastics includes at least two float-and-sink separators, said apparatus-equipped processing line further comprising a fluid separator and a drier placed at least upstream of a second one of said at least two float-and-sink separators.

9. An apparatus-equipped processing line according to claim 6, wherein said at least one device for separating the mixture of different types of recyclable plastics includes at least two float-and-sink separators, said apparatus-equipped processing line further comprising a fluid separator and a drier placed at least upstream of a second one of said at least two float and sink separators.

10. An apparatus-equipped processing line according to claim 7, wherein said at least one device for separating the mixture of different types of recyclable plastics includes at least two float-and-sink separators, said apparatus-equipped processing line further comprising a fluid separator and a drier placed at least upstream of a second one of said at least two float and sink separators.

* * * * *